March 1, 1949.  C. W. HOFFMAN ET AL  2,463,175
VALVE CONNECTOR
Filed July 25, 1946

INVENTOR.
C. W. HOFFMAN
T. A. ST. CLAIR
BY
ATTORNEYS

Patented Mar. 1, 1949

2,463,175

UNITED STATES PATENT OFFICE 2,463,175

VALVE CONNECTOR

Clarence W. Hoffman and Theodore A. St. Clair, Bartlesville, Okla., assignors to Phillips Petroleum Company, a corporation of Delaware Application July 25, 1946, Serial No. 686,251

6 Claims. (Cl. 285—120)

This invention relates to a valve connector. In one of its more specific aspects it relates to a valve connector adapted to make connection between a flexible hose and a valve.

Liquefied petroleum gases are transported and stored under considerable pressure on account of their relatively low boiling points, and high vapor pressure at atmospheric temperature. Propane has a vapor pressure of about 188.6 pounds per square inch at 100° F., while that for butane is about 51.6 pounds at the same temperature. Mixtures of these two exhibit total pressure values between those of the pure compounds at a corresponding temperature.

Such liquefied petroleum gases are widely used as bottled gas in areas where natural or artificial gas is not available. For such use steel cylinders or bottles are used in dispensing these products to consumers. These cylinders are heavy walled steel containers fitted with valves adapted for high pressure service. Bulk terminals or stations perform refill service when bottles are empty. In a refilling operation it is common practice to use a flexible high pressure hose extending from a source of L. P. G. to a cylinder to be filled. The end of such a hose is connected by a coupling to the valve on a cylinder for this filling operation.

Equipment manufacturers make many types of these valves for use on L. P. G. cylinders and most of these valves are made with 1¾ inch diameter inlet openings with No. 6 acme threads. Flexible filler hose having connectors with this thread will therefore fit on such valves.

A multiple outlet valve described in an application for patent, Serial No. 650,106 is being widely used at the present time. The standard filler hose connectors do not fit with this multiple outlet valve, and it is one object of our invention to devise a valve connector which will fit on the multiple outlet valve of Serial No. 650,106 and on the standard multiple outlet valve.

Another object of our invention is to devise a valve connector for such service as herein disclosed which is simple to construct and easy to connect and disconnect from the valves.

Still other objects and advantages of our invention will be apparent to those skilled in the art from a careful study of the following disclosure, which when taken with the attached drawing respectively describes and illustrates a preferred form of our valve connector assembly.

Figure 1:
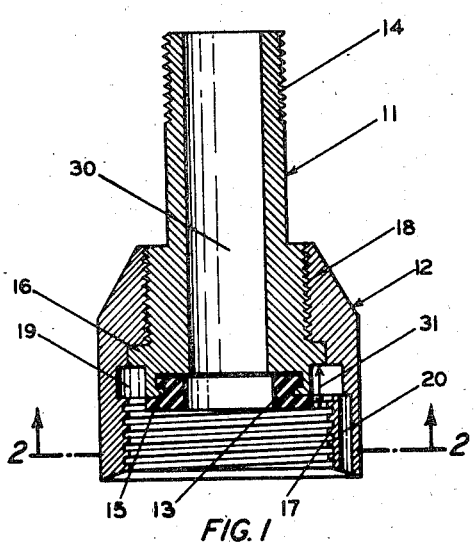
Figure 1 illustrates a sectional elevation of our valve connector assembly.

Referring to the assembly illustrated in Figure 1, our connector is composed of three parts, a nipple 11, a collar or coupling 12 and a gasket 13.

On the upper end of the nipple member 11 are threads 14 for fastening to the outlet end of a filling hose, not shown. On the lower extremity of the nipple is a lip or flange 15 adapted to hold the gasket 13 firmly in place. A shoulder 16 on the nipple provides a stop so as to limit the downward movement of the collar with respect to the nipple.

The threads 14 are conventional right handed threads while the threads 17 are No. 6 acme threads to match the threads of the several types of filling valves.

The threads 18 are left handed threads on the nipple and collar and of small pitch as compared to the pitch of the acme threads 17.

Figure 4:
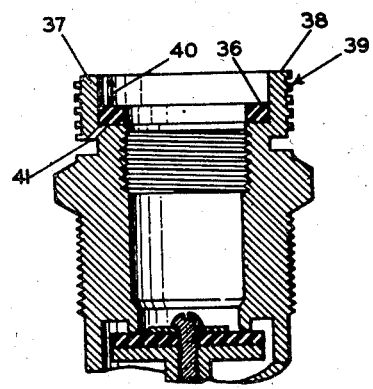
Figure 4 illustrates the connecting end of a filler valve of standard manufacture.

The annular space 19 provided between the nipple and collar fulfills a purpose when my connector is used with a standard filler valve, such as the one illustrated in part, in Figure 4.

The resilient gasket member 13 may be constructed in the form as illustrated in Figure 1. The grooved portion is made to fit into the lipped end of the nipple member so that the gasket will remain fixed and in place. Material of construction may be of the synthetic rubber type, or any suitable material provided, of course, it can withstand solvent action of the hydrocarbons with which it comes in contact. These interfitting lipped surfaces need not necessarily be shaped exactly as illustrated, the point being some provision for retaining the gasket in position.

The diameter of the shoulder 16 of the nipple should be smaller than the smallest diameter of the acme threaded section 17 of the collar so that as the hose connecting end of the nipple is passed through the collar in assembling the unit, the shoulder 16 will pass freely through this threaded section.

A hole 20 is drilled parallel to the longitudinal axis of the assembly in the collar member, as shown in Figure 1, to provide a passageway to vent locked in pressure when disconnecting the fitting from a valve following a cylinder filling operation.

Figure 2:
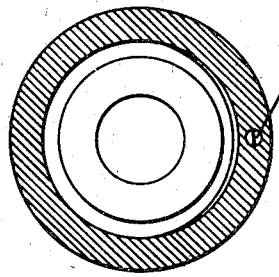
Figure 2 is a cross sectional view taken on the line 2—2 of Figure 1.

Figure 2 shows the positioning of this hole 20.

Figure 3:
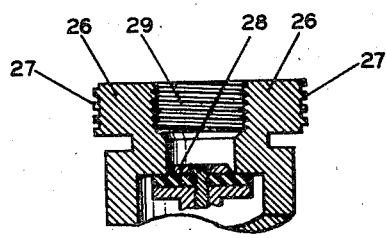
Figure 3 illustrates the connecting end of a new type filler valve.

Figure 3 illustrates the coupling end of a filler valve as described in the hereinbefore mentioned patent application. The acme threaded portion 17 of the collar 12 is screwed onto a corresponding acme threaded portion 27 of this valve. Since these acme threads are right handed, turning the collar to the right will advance the collar on the valve. At the same time since the threads 18 on the collar and nipple are left handed, this same turning of the collar will advance the nipple in the collar. Upon continued turning of the collar to the right the sealing surface 26 of the valve meets the gasket 13 and by slight forced turning of the collar a pressure restraining seal is made between the lower end of the nipple and the surface 26 through compression of the gasket 13.

After a filling operation is complete, the collar is turned in the reversed direction (to the left) and the seal is broken. When the seal is broken gaseous pressure in the space 29—30 in the nipple and above the valve member 28 is released through the opening 20. When this pressure is fully released the collar 12 may then be removed from the valve by hand.

Figure 4 illustrates a standard type valve for use with L. P. G. cylinders. A connection of this valve with my valve fitting is made in the same manner as above described, that is, the collar 12 is turned to the right when the collar advances on to the threaded section 39 of this valve while the nipple 11 and the gasket 13 advance in the collar to meet the valve of Figure 4. However, the seal with this valve is made by contact of the gasket 13 of Figure 1 with the gasket 36 of Figure 4. The surface 37 is not the sealing surface in this case.

When making this connection by turning the collar 12 to the right the advance end 38 of this acme threaded section 39 extends into the annular space 19, shown in Figure 1. During this attaching operation, as with the valve of Figure 3, the (nipple and) gasket 13 travels downward to contact the gasket 36 on account of the left hand threads 18. In construction of our fitting it is necessary to make certain that the distance 31 when the gasket 13 is in compression is greater than the distance 40 in Figure 4 when the gasket 36 is in compression. That is, the space 19 accommodates the advance end of the acme threaded portion 38 of this valve under all conditions.

To disconnect our fitting from the valve of Figure 4 it is merely necessary to rotate the collar to the left when the valve and gasket 36 separate from the nipple and gasket 13. Pressure is vented through the opening 20. Some standard valves have vent openings such as indicated by reference numeral 41.

While for ease of manufacture and freedom from rusting we prefer to make our valve connector from brass bar stock, other suitable metal stocks may be used.

One important point to be considered in using brass is safety, and by using brass, since sparking between this material and steel does not occur, possible explosions from this cause are eliminated.

It will be obvious to those skilled in the art that many alterations and variations in details of our valve fitting may be made, such as the shape or form of the gasket 13, shape or form of the lip or flange 15, or the pitch of the threads 18, and yet remain within the intended spirit and scope of our invention as defined by the appended claims.

Having disclosed our invention, we claim:

1. A fitting for making connection between a conduit and a filler valve for a liquefied petroleum gas cylinder comprising a nipple member having means at one end for attachment to said conduit and having a gasket retaining means at the other end and a threaded section intermediate the ends; a rotatable collar member adjacent said other end and threaded at one end to mesh with said intermediate threaded section of the nipple and threaded at its other end to mesh with filler valve threads; and a gasket fitted to said gasket retaining means.

2. A fitting for making a fluidtight connection between a conduit and a filler valve for a liquefied petroleum gas cylinder comprising a nipple member having means at one end for attachment to said conduit and having a gasket retaining means at the other end adapted to hold an annular shaped gasket adjacent said other end of the nipple and an exterior threaded section intermediate the ends; a rotatable collar member adjacent said gasket end of the nipple and having interior threads at one end to mesh with said intermediate threaded section of the nipple and threaded at its other end to mesh with threads on a filler valve; and an annular resilient gasket fitted to said gasket retaining means.

3. A fitting for making a fluidtight connection between a conduit and a filler valve for a liquefied petroleum gas cylinder comprising, in combination, a nipple member having means at one end for attachment to said conduit, gasket retaining means at the other end adapted to hold an annular shaped gasket, and an exteriorly threaded section intermediate the ends thereof; a rotatable collar member adjacent said gasket end of the nipple having interior threads at one end to mesh with said intermediate threaded section, and threads at the other end of said collar member which are of opposite hand with respect to said interior threads for engagement with threads on a filler valve, whereby rotation of said collar effects movement of said nipple and filler valve in opposite directions; and an annular resilient gasket fitted to said gasket retaining means.

4. A fitting for making a fluidtight connection between a conduit and a filler valve for a liquefied petroleum gas cylinder comprising, in combination, a nipple member having means at one end for attachment to said conduit, gasket retaining means at the other end adapted to hold an annular shaped gasket, said gasket retaining means being of reduced diameter with respect to the adjacent portion of the nipple member, and an exteriorly threaded section intermediate the ends thereof; a rotatable collar member adjacent said gasket end of the nipple having interior threads at one end to mesh with said intermediate threaded section and threads at the other end of said collar member which are of opposite hand with respect to said interior threads to mesh with threads on a filler valve, said collar member and said reduced portion of the nipple defining an annular chamber communicating with the interior of said collar whereby the fitting is adapted to receive filler valves of different sizes; and an annular resilient gasket fitted to said gasket retaining means.

5. The fitting of claim 4 wherein the collar member at its filler valve threaded end contains an opening in its side wall, the longitudinal axis of this opening being parallel to the longitudinal axis of the adjacent threaded section and said opening communicating with the annular chamber defined by said collar and reduced portion of said nipple member.

6. The fitting of claim 4 wherein the intermediate threaded section of the nipple and the meshing collar threads are left hand threads and the threads at the other end of the collar are right hand threads of greater pitch than said left hand threads and wherein the collar member at its filler valve threaded end contains an opening in its sidewall, the longitudinal axis of this opening being parallel to the longitudinal axis of the adjacent threaded section and said opening communicating with the annular chamber defined by said collar and the reduced portion of said nipple member.

CLARENCE W. HOFFMAN.
THEODORE A. ST. CLAIR.

REFERENCES CITED

The following references are of record in the file of this patent:

UNITED STATES PATENTS

| Number | Name | Date |
|---|---|---|
| 290,045 | Hardy | Dec. 11, 1883 |
| 500,412 | McIntyre | June 27, 1893 |
| 2,082,164 | Karrer | June 1, 1937 |